(12) United States Patent (10) Patent No.: US 9,085,271 B2
Kreil (45) Date of Patent: Jul. 21, 2015

(54) SLIDE OUT ROOM SEAL ASSEMBLY

(71) Applicant: LIPPERT COMPONENTS MANUFACTURING, INC., Elkhart, IN (US)

(72) Inventor: Craig J. Kreil, Mishawaka, IN (US)

(73) Assignee: LIPPERT COMPONENTS MANUFACTURING, INC., Elkhart, IN (US)

( * ) Notice: Subject to any disclaimer, the term of this patent is extended or adjusted under 35 U.S.C. 154(b) by 0 days.

(21) Appl. No.: 14/452,678

(22) Filed: Aug. 6, 2014

(65) Prior Publication Data

US 2015/0042120 A1 Feb. 12, 2015

Related U.S. Application Data

(60) Provisional application No. 61/862,802, filed on Aug. 6, 2013.

(51) Int. Cl.
*B60R 13/06* (2006.01)
*B60P 3/34* (2006.01)
*B60J 10/00* (2006.01)
*B60J 10/08* (2006.01)
*E04B 1/343* (2006.01)

(52) U.S. Cl.
CPC ............... *B60R 13/06* (2013.01); *B60J 10/00* (2013.01); *B60J 10/081* (2013.01); *B60P 3/34* (2013.01); *E04B 1/34305* (2013.01)

(58) Field of Classification Search
CPC .... B60J 10/00; B60J 10/0014; B60J 10/0054; B60J 10/0091; B60J 10/081; B60P 3/32; B60P 3/34; B60P 3/39; B60R 13/06; B62D 63/06; B62D 63/061; E04B 1/34305

USPC ............. 296/26.01, 26.03, 26.12, 26.13, 165, 296/170, 171, 172, 173, 175, 176
See application file for complete search history.

(56) References Cited

U.S. PATENT DOCUMENTS

| 4,785,590 A  * | 11/1988 | Jones ................................ 52/64 |
| 6,874,283 B1 * | 4/2005  | Hindle .............................. 52/67 |
| 7,540,116 B1   | 6/2009  | Martinson |
| 8,366,168 B1   | 2/2013  | Ksiezopolski et al. |
| 2008/0116707 A1* | 5/2008 | Boaz et al. ................. 296/26.01 |
| 2012/0032406 A1 | 2/2012 | Ksiezopolski et al. |

FOREIGN PATENT DOCUMENTS

GB           1106440           3/1968

OTHER PUBLICATIONS

International Search Report and Written Opinion issued in Int'l Pat. Appl. No. PCT/US2014/049854, Apr. 15, 2015.

* cited by examiner

*Primary Examiner* — Jason S Daniels
(74) *Attorney, Agent, or Firm* — Barnes & Thornburg LLP

(57) ABSTRACT

A seal assembly for sealing an interface between a structure having a side wall having an opening therein and a slide-out compartment that may be extended and retracted through the opening includes a first channel attached to the side wall and a complementary second channel attached to the compartment. The first channel includes a pair of wiper seals. The second channel is movable with respect to the first channel such that a flange of the second channel may be received within an interior of the first channel in engagement with the pair of wiper seals.

19 Claims, 6 Drawing Sheets

SLIDE OUT ROOM SEAL ASSEMBLY

CROSS-REFERENCE TO RELATED APPLICATIONS

This application claims benefit under 35 U.S.C. §119 of U.S. Provisional Patent Application No. 61/862,802, filed on Aug. 6, 2013, and incorporates by reference the disclosure thereof.

BACKGROUND AND SUMMARY OF THE DISCLOSURE

The disclosure relates generally to recreational vehicles ("RVs") having slide-out rooms and, more particularly, to seal arrangements for interfaces between such vehicles and slide-out rooms.

RVs often include slide-out rooms that afford additional living space within the RV when the slide-out rooms are deployed. A typical slide-out room has the form of a box having a floor, a roof, an end or outside wall, two side walls, and an open front that allows access to and from the slide-out room from the interior of the RV.

A slide-out room typically is installed in an opening in a stationary side wall of an RV so that it can extend and retract generally perpendicularly through the opening. When the slide-out room is retracted, the floor of the slide-out room typically is positioned slightly above the floor of the RV. The opening in the wall of the RV is larger than the corresponding dimensions of the slide-out room so that the slide-out room can be extended and retracted without contacting or otherwise interfering with the side wall. As such, a gap exists between the RV and the slide-out room. This gap must be sealed when the slide-out room is fully extended or retracted to preclude the elements from entering the living space within the RV. Typically a seal is provided in the interface between an inner surface of a flange extending about the outer wall of the slide-out room and the outer surface of the RV's side wall when the room is retracted. Another seal may be provided in the interface between a flange extending about the open front of the slide-out room and the inner surface of the RV's side wall when the room is extended.

Many slide-out rooms extend and retract though a path that includes substantially no vertical component and substantially no horizontal component perpendicular to the general direction of travel. Because the movement of the slide-room is generally one-dimensional, the interfaces between the foregoing flanges of such slide-rooms and the corresponding surfaces of the RV's sidewall can be sealed using any number of conventional seals, for example, bulb seals, that function well in compression. Such seals could have a portion installed on one of the RV's sidewall and on the foregoing flanges of the slide-out room and a portion that engages with the other of the sidewall and flanges when in use. A drawback to this form of slide-out room is that the floor of the slide-room remains above the floor of the RV when the room is extended.

Some slide-out rooms have floors that are flush with the floor of the RV when the room is extended. Some mechanisms that provide for this feature include a ramp structure that allows the slide-out room to be gradually lowered as it is extended and gradually raised as it is retracted. As such, the vertical component of path through which the slide-room travels as it is extended and retracted is relatively small when the room approaches the fully extended and fully retracted positions. Because the movement of the slide-room in such embodiments is nearly one-dimensional at the travel limits, conventional seals, such as bulb seal, can be used to seal the foregoing interfaces.

Other slide-out rooms extend and retract though a path that is substantially horizontal until the room nears its travel limit when the room is extended. The room may then drop or move substantially vertically into its final deployed position. Conventional bulb seals are not well-suited for use with such slide-out rooms because the foregoing vertical movement of the slide-out room is likely to place a substantial shear load on the seal, and conventional bulb seals do not readily tolerate such shear loads. Indeed, such shear loads could damage the seal and/or dislodge it from its attachment points to the RV or slide out room.

The present disclosure illustrates and describes a seal assembly for use with such slide-out rooms. The seal assembly may be usable with other slide-out rooms, as well.

DETAILED DESCRIPTION OF THE DRAWINGS

Figure 1:
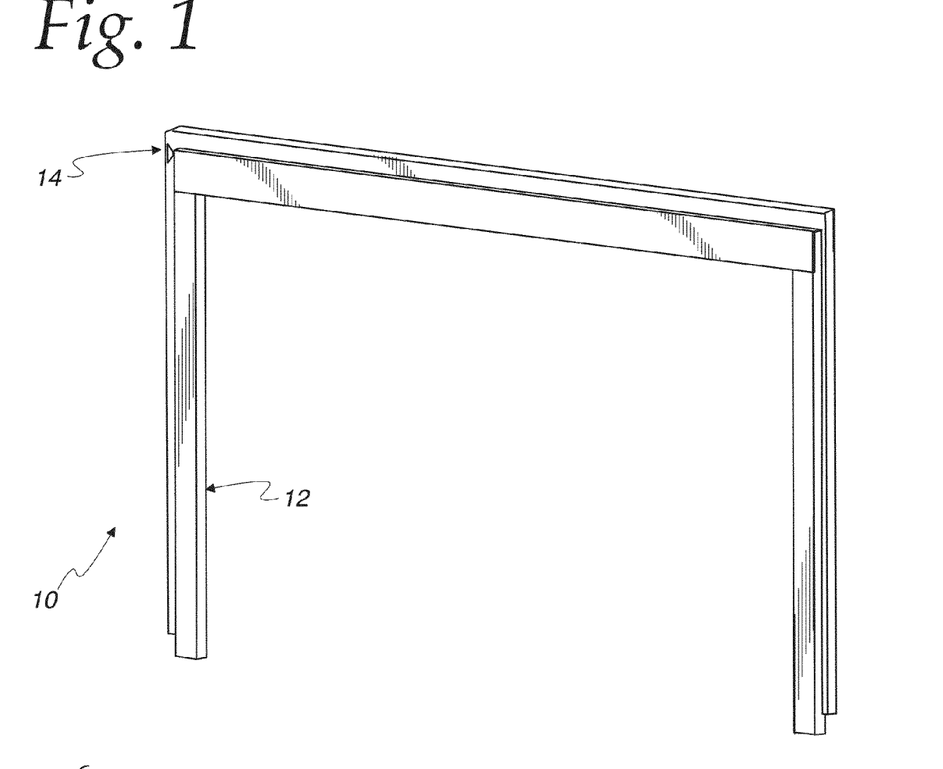
FIG. 1 is a perspective view of an illustrative seal assembly for use with an RV having a slide out room, including a slide out room channel and an RV wall channel, the RV wall channel including a pair of wiper seals.

FIG. 1 shows an illustrative seal assembly 10 that may be used for providing a seal between a side wall 20 of an RV having an opening there through and a slide-out room 22 or compartment configured to extend from and retract into an interior of the RV through the opening. The seal assembly 10, however, is not limited to such use. Instead, it could be used to provide a seal between any structure having a side wall with an opening there through and a compartment configured to extend from and retract into an interior of the compartment through the opening.

The seal assembly 10 includes a slide-out room (or first) channel 12 and a wall (or second) channel 14. The room channel 12 includes a header or top section 12H and a pair of side or jamb sections 12J. Similarly, the wall channel 14 includes a header or top section 14H and a pair of side or jamb sections 14J.

Figure 2:
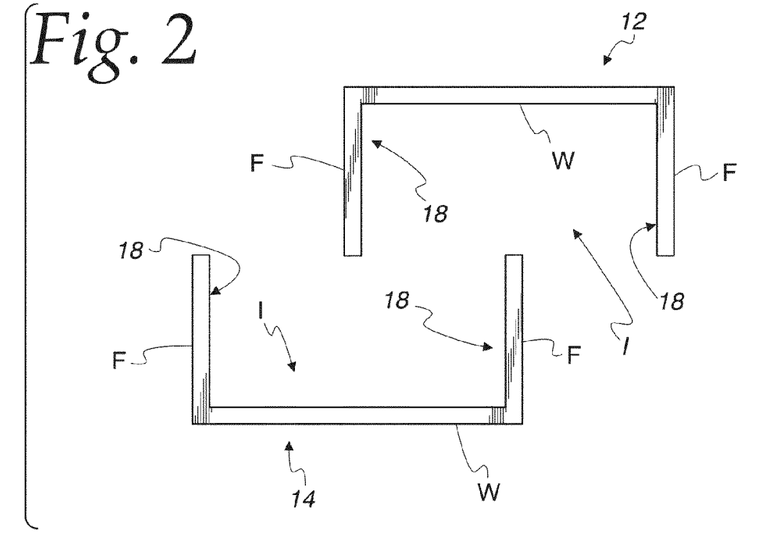
FIG. 2 is a bottom end view of a jamb section of the seal assembly of FIG. 1 with the wiper seals not shown for clarity.

As best shown in FIG. 2, each channel 12, 14 includes a web W and a pair of flanges F extending perpendicularly from end of the web. The web W and flanges F of each channel 12, 14 cooperate to define interior portions I of the channels 12, 14. Each flange F of each channel 12, 14 defines an inner surface. The inner surfaces of 18 of the flanges F of each channel 12, 14 face each other.

Figure 5:
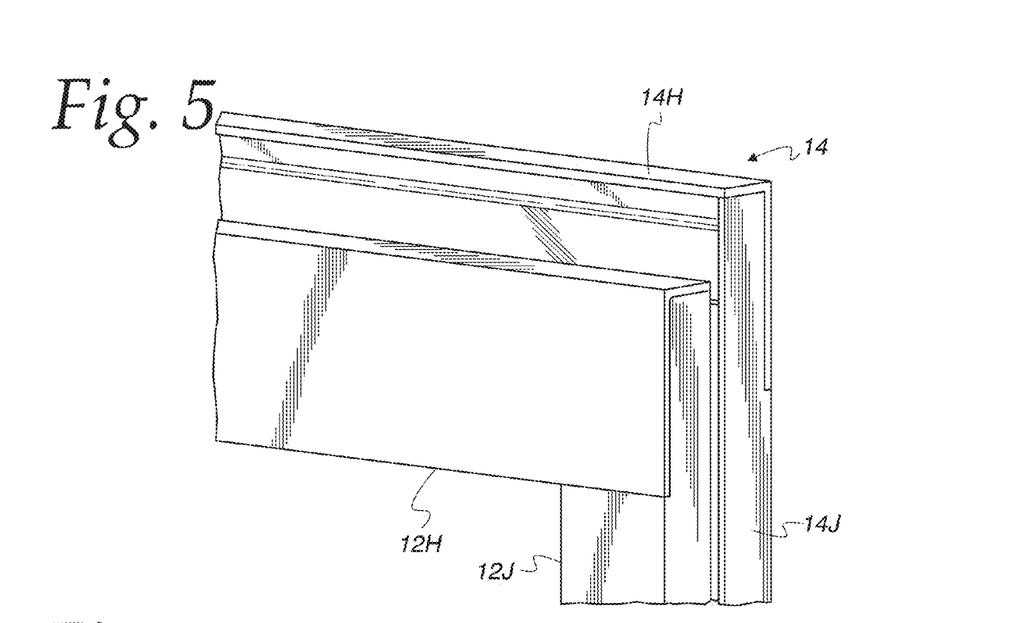
FIG. 5 is a perspective view of an upper corner of the seal assembly of FIG. 1.
Figure 6:
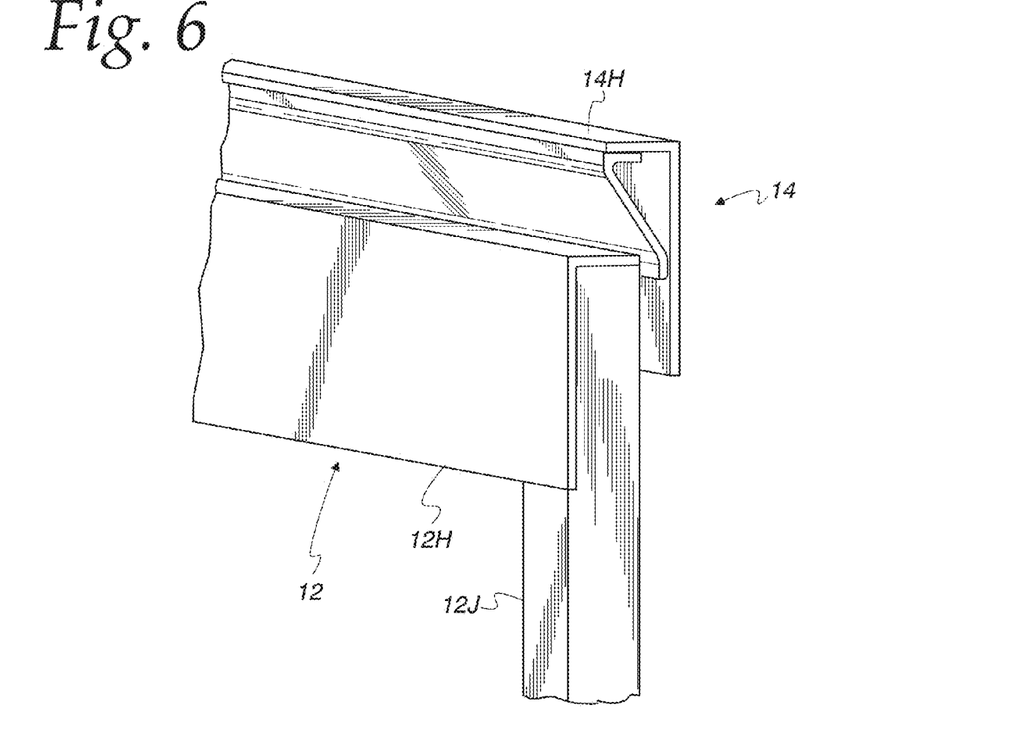
FIG. 6 is a cut-away perspective view of an upper corner of the seal assembly of FIG. 1.
Figure 11:
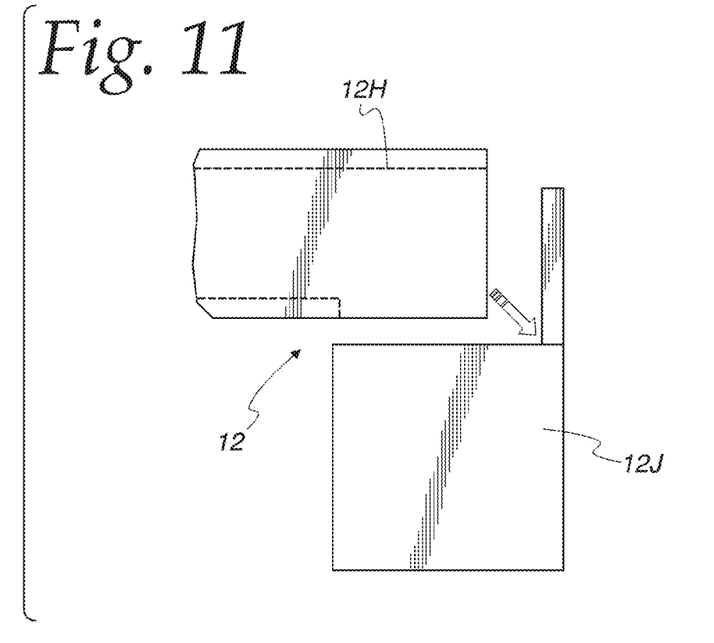
FIG. 11 is a exploded elevation view of a corner of the slide-out room channel of the seal assembly of FIG. 1.

As best shown in FIGS. 5, 6 and 11, a portion of the web W and inner flange F of the jamb sections 12J of the slide-out room channel 12, as well as portions of the lower flange of header section 12H are removed to facilitate joining of the header section 12H to the jamb section 12J at the corners of slide-out room channel 12. Portions of the header and/or jamb sections of the wall channel 14 may be removed in a similar manner to facilitate joining of the header section 14H to the jamb sections 14J at the corners of the wall channel 14.

Figure 9:
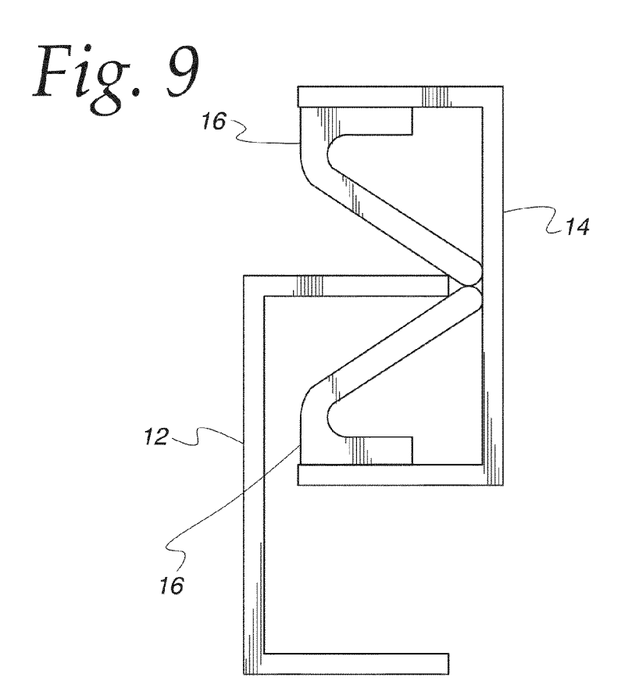
FIG. 9 is a cross-sectional end view of header sections of the seal assembly of FIG. 1 with the slide-out room channel engaged with the wiper seals of the wall channel in a second configuration.
Figure 10:
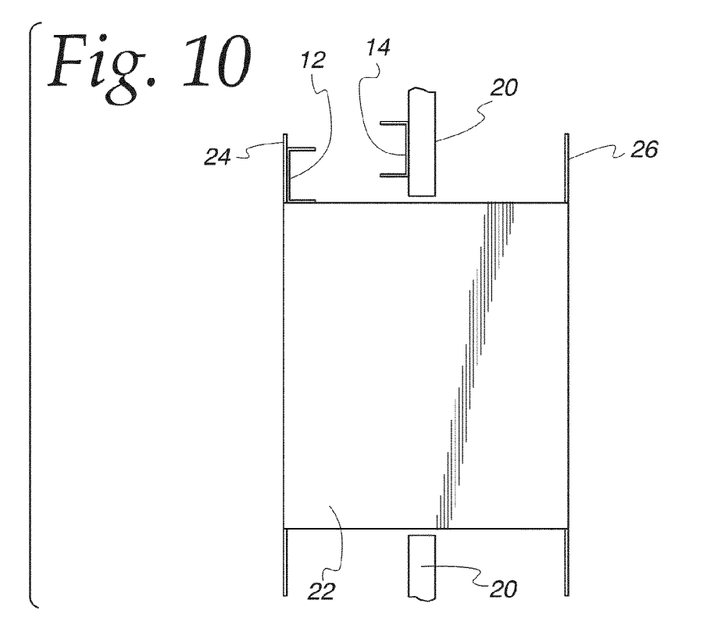
FIG. 10 is a cross-sectional side elevation view of a slide-out room installed in an opening in a wall of an RV midway between a retracted position and an extended position.

As shown, for example, in FIG. 9, the room channel 12 is configured for attachment to outer surfaces of the roof and side walls of a slide-out room 22 or other slidable compartment. For example, one of the flanges F of the roof and jamb sections 12A, 12B, of the room channel could be attached to corresponding portions of the slide-out room 22 using adhesives, screws or other mechanical fasteners, combinations of adhesives and fasteners, or other suitable means. Typically, the slide-out room channel 12 would be attached near an open inner end of the slide-out room 22 and/or an inner slide-out room flange 24 extending peripherally from the roof, walls, and floor thereof. Alternatively, the room channel 12 could be configured for attachment to an outwardly-facing surface of the inner slide-out room flange 24. For example, the web W of the roof and jamb sections 12A, 12B, 12C of the room channel could be attached to the inner room flange using adhesives, screws or other mechanical fasteners, combinations of adhesives and fasteners, or other suitable means.

The wall channel 14 is configured for attachment to an inner surface of the side wall 20 of the RV proximate the opening therein. For example, the web W of the wall channel 14 could be attached to the inner surface of the side wall 20 using adhesives, screws or other mechanical fasteners, combinations of adhesives and fasteners, or other suitable means. Alternatively, the wall channel 14 could be attached to an inner edge of the opening in the side wall 20 of the RV or other structure or to an inner surface of the wall proximate the opening in a manner similar to that described above in connection with attachment of the slide-out room channel 12 to the slide out room 22.

The channels 12, 14 are configured such that the wall channel 14 can selectively receive at least a portion of one of the flanges F (typically the outermost flange F) of the slide-out room channel 12 in the interior thereof when the slide-out room is extended through the opening in the sidewall 20 of the RV.

In the illustrated embodiment, a wiper seal 16 is attached to each of the opposing inner surfaces 18 of the flanges F of the wall channel 14. Each wiper seal 16 includes an attachment portion 16A for attachment to the corresponding flange F inner surface 18 and a wiper portion 16B having a free end 16C extending into the space between the flanges F of the wall channel 14. Alternatively, the wiper seals 16 could be attached to the web W of the wall channel 14 and configured such that the wiper portions 16B and free ends 16C similarly extend into the space between the flanges F of the wall channel 14. The wiper portions 16B are shown as extending from near the free ends of the flanges F of the slide-out room channel, but could extend from a portion of the flange F between its free end and the web W of the wall channel 14. The wiper portions 16B of the wipers 16 may, but need not be, generally symmetrical.

Figure 3:
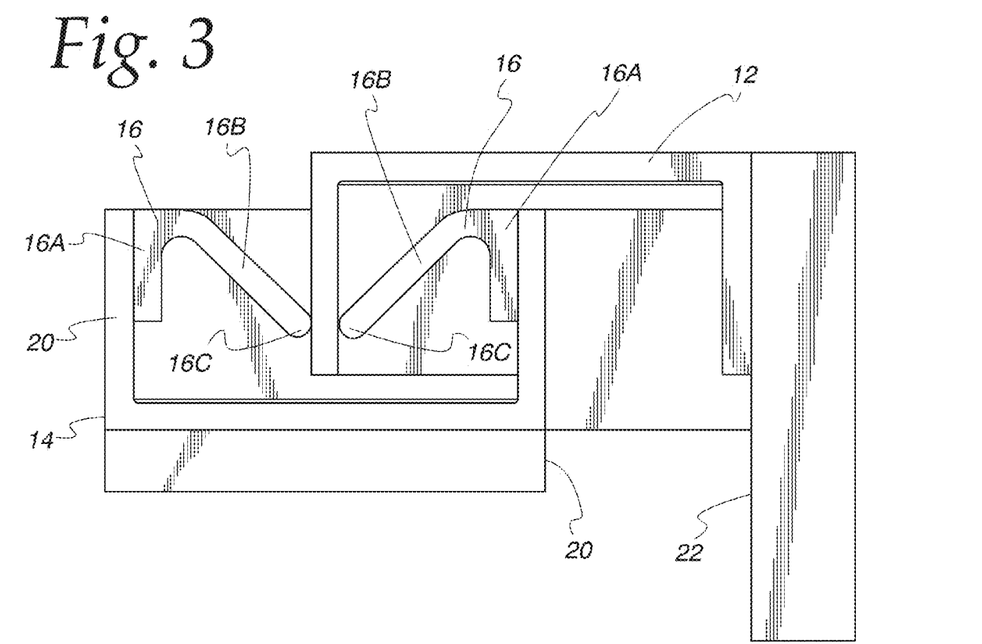
FIG. 3 is a partial end bottom end view of the seal assembly of FIG. 1.
Figure 4:
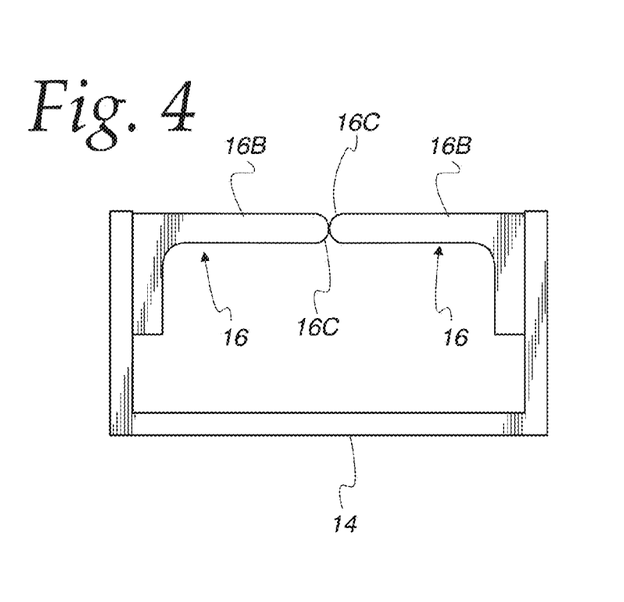
FIG. 4 is a partial end bottom end view of a jamb section of the wall channel of the seal assembly of FIG. 1.

As best shown in FIG. 3, the wiper portions 16B of the jamb sections of the wall channel 14 are configured such that free ends 16C thereof selectively engage with a surface of the flange F of the slide-out room channel 12 when the flange F of the slide-out room channel 12 is selectively received within the interior I of the wall channel 14 (sometimes referred to as an "engaged position"). As best shown in FIG. 4, when the room channel 12 is withdrawn from the interior I of the wall channel 14, the wiper portions 16B move to a position wherein the free ends 16C thereof can, but need not, touch each other (sometimes referred to as a "disengaged position" or "normal position"). Alternatively, end portions of the wiper seals could overlap (for example, as shown in FIG. 7, which shows the wiper seals 16 of the top section of the wall channel 14).

Figure 7:
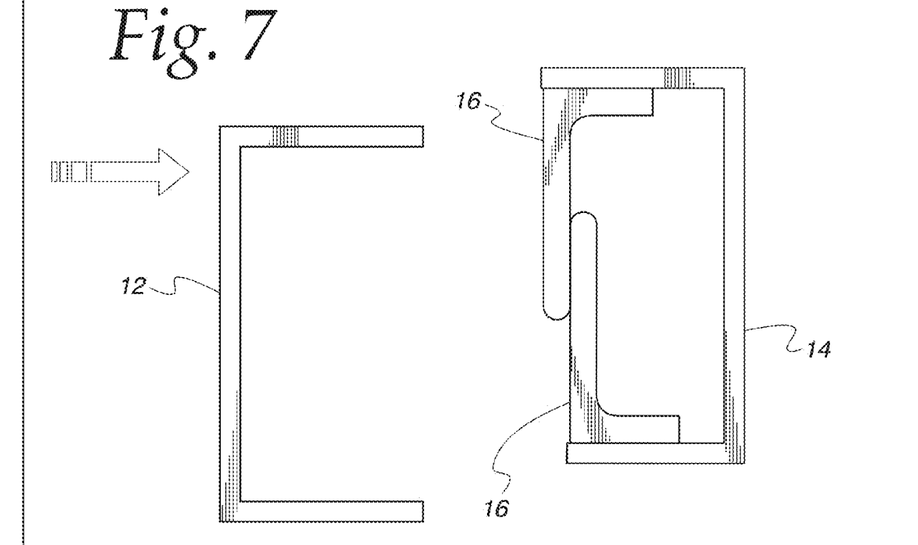
FIG. 7 is a cross-sectional end view of header sections of the seal assembly of FIG. 1 with the slide-out room channel disengaged from the wall channel.
Figure 8:
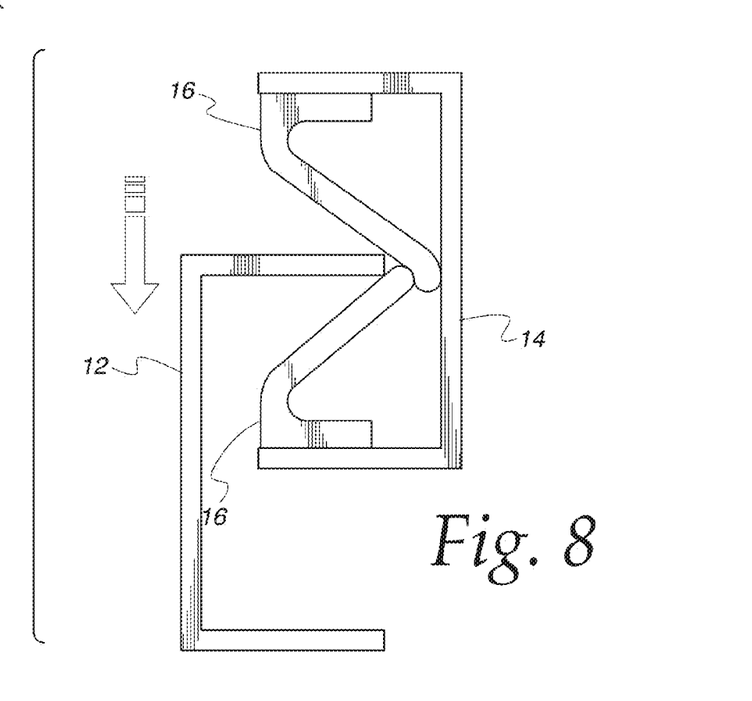
FIG. 8 is a cross-sectional end view of header sections of the seal assembly of FIG. 1 with the slide-out room channel engaged with the wiper seals of the wall channel in a first configuration.

As best shown in FIG. 7, the wiper portions 16B of the header section of the wall channel 14 are configured such that substantial portions of the wiper portions 16B substantially overlap each other in the disengaged position. The amount of overlap for a particular application could be determined as a function of the slide-out room operating mechanism design, as will be discussed further below in connection with operation of the seal assembly. FIGS. 8 and 9 show various embodiments of the wiper portions 16B of the header section of the wall channel 14 in the engaged position, as will be discussed further below in connection with operation of the seal assembly.

Figure 12:
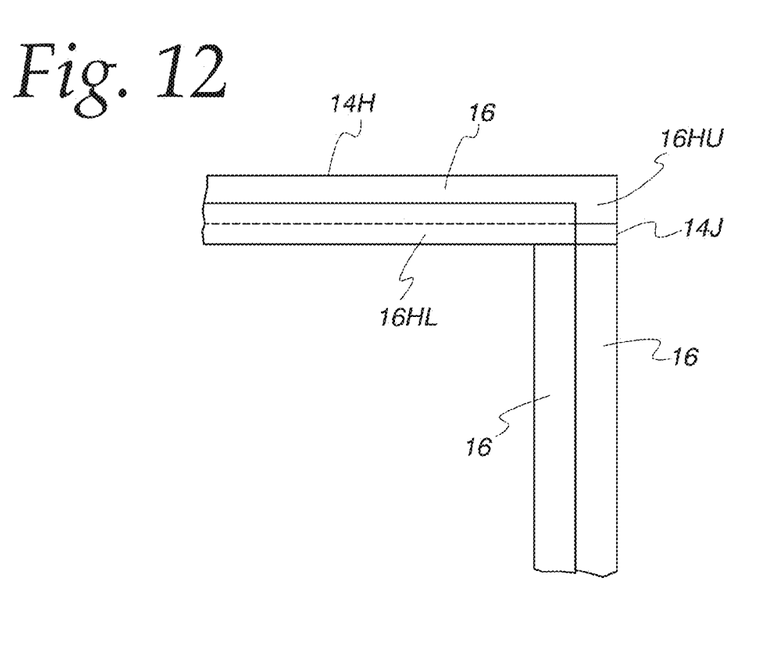
FIG. 12 is an elevation view of a corner of the wall channel of the seal assembly of FIG. 1 showing the wiper seals therein.

As best shown in FIGS. 5, 6, and 12, the lower of the wiper seals 16HL in the header section of the wall channel 14 does not extend the entire width of the header section 14H. Instead, it is truncated such that it is no longer than the distance between the outermost flanges F of the jamb sections of the slide-out room channel 12. Also, the wiper seals 16 of the jamb section 14J do not extend fully into the header section 14H. Instead, the wiper seals 16 of the jamb section 14J may be truncated to provide clearance for the wiper seals 16 of the header section 14H.

The wiper seals 16 may be made of any suitable material having sufficient flexibility and resiliency to allow displacement of the wiper portions 16B from the engaged position to the disengaged position. For example, without limitation, the wiper seals 16 may be made of rubber.

The seal assembly 10 may be used in conjunction with an RV having a slide out room with a floor that lies above the floor of the RV when the slide-out room is fully retracted, and that is flush with the floor of the RV when the slide-out room is fully deployed, especially where the operating mechanism for the slide out room initially causes the slide-room to travel substantially horizontally with respect to the RV, and then substantially vertically with respect to the RV when the slide-out approaches or reaches its full extension from the RV.

In operation, with the slide-out room fully retracted into the RV, the floor of the slide-out room lies above the floor of the RV, and the wiper seals 16 of the wall channel 14 are in their disengaged position. The slide out room initial travels substantially horizontally. As the slide out room approaches the limit of its horizontal travel, the flange F of the jamb section 12J of the slide-out room channel 12 engages one or both of the corresponding wiper seals 16 of the jamb portion 14J of the wall channel 14, and the flange F deflects the free ends 16C of the wiper portions 16B of the wiper seals 16, such that the free ends 16C engage with the inner and outer surfaces of the flange F. This condition is shown in FIG. 3. When the slide-out room reaches the end of its horizontal travel, it travels vertically in a downward direction over a predetermined distance, which may be several inches, for example, three inches or more or less. As the slide-out room is lowered, the flange F of the jamb section 12J of the slide-out room channel 12 slides vertically between the wiper seals 16 to a rest condition the same or similar to that shown in FIG. 3.

Also, as the slide-out room approaches the extent of its horizontal travel, the flange F of the header section 12H of the slide-out room channel 12 engages an outermost of the wiper portions 16B of the wiper seals 16 of the header section 14H of the wall channel 14. Typically, this would be the wiper portion 16B of the upper wiper seal 16HU. The flange F typically would contact this wiper portion 16B at a distance from the free end of the wiper seal greater than the distance through which the slide-out room is lowered vertically to its fully deployed position. For example, if the slide-out room were to be lowered by three inches to its fully deployed position, flange F would initially contact wiper seal at least three inches above the free end 16C of the upper wiper seal 16HU. This might correspond to about 75% of the distance from the free end 16C of the wiper portion 16B to its base proximate the corresponding flange F of the wall channel 14.

As the slide-out room is lowered, the flange F remains in contact with the wiper portion 16B until and after the slide-out room and flange F come to rest in the fully deployed position. This condition is shown in FIGS. 8 and 9. More specifically, FIG. 8 shows an embodiment in which the wiper portion 16B of the upper wiper seal 16HU is pinched between the flange F of the slide-out room channel 12 and the web W of the wall channel 14. FIG. 9 shows a variation in which the free end 16C of the wiper portion 16B of the upper wiper seal 16HU rest upon the outer surface of flange F of the slide-out room channel 12.

Also, as the slide-out room is lowered, the consequent lowering of the flange F of the slide-out room channel 12 causes the lower wiper seal 16HL of the header section 14H of the wall channel 14 to engage with the inner surface of the flange F as shown, for example, in FIGS. 8 and 9.

The seal assembly 10 also could be used to seal an interface between an RV and a slide out room that extends and retracts in other manners, for example, substantially horizontally, with or without a gradual vertical component of travel. Further, the seal assembly 10 could be used to seal an interface between other structures having a side wall and a compartment configured to be extended from and retracted into the structure through an opening in the side wall using any of the foregoing extension and retraction mechanisms and/or methods.

The embodiments shown and described herein are illustrative and should not be construed to limit the scope of the invention as set forth in the following claims.

The invention claimed is:

1. A seal assembly for a structure having a side wall, an opening in the sidewall, and a slide-out compartment that can be extended and retracted through the opening, the seal assembly comprising:
a first channel configured for attachment to the side wall, the first channel comprising a web and a pair of flanges extending from the web, the web and flanges of the first channel cooperating to define an interior of the first channel, the first channel further comprising a header section and at least one jamb section extending from the header section;
a second channel configured for attachment to the slide-out compartment, the second channel comprising a web and a pair of flanges extending from the web, the web and flanges of the second channel cooperating to define an interior of the second channel, the second channel further comprising a header section and at least one jamb section corresponding to the header section and the at least one jamb section of the first channel;
a first pair of wiper seals attached to the first channel and operably associated with the interior of the header section of the first channel, each of the first pair of wiper seals having a wiper portion directed generally toward and overlapping the wiper portion of the other of the first pair of wiper seals;
a second pair of wiper seals attached to the first channel and operably associated with the interior of the at least one jamb section of the first channel, a first of the second pair of wiper seals having a wiper portion directed generally toward the wiper portion of the other of the second pair of wiper seals;
wherein a flange of the pair of flanges of the second channel is movable toward the first channel in a first direction generally perpendicular to the web of the first channel between a first position wherein the flange of the pair of flanges of the second channel is distant from the first channel and a second position wherein the flange of the pair of flanges of the second channel is received in the interior of the first channel such that each of the wiper seals engages flange of the pair of flanges of the second channel.

2. The seal assembly of claim 1 wherein the first pair of wiper seals comprises an upper wiper seal and a lower wiper seal, and a portion of the upper wiper seal overlaps a portion of the lower wiper seal.

3. The seal assembly of claim 2 wherein a free end of the flange of the pair of flanges of the second channel first contacts the upper wiper seal when the second channel is moved in the first direction toward the first channel.

4. The seal assembly of claim 3 wherein the second channel further is movable in a second direction generally perpendicular to the first direction between the second position and a third position with respect to the first channel with the flange of the pair of flanges of the second channel received in the interior of the first channel.

5. The seal assembly of claim 4 wherein each of the wiper seals engages the flange of the pair of flanges of the second channel when the second channel is in the third position.

6. The seal assembly of claim 5 wherein the upper wiper seal partially extends when the second channel moves from the second position to the third position.

7. The seal assembly of claim 5 wherein the lower wiper seal is deflected when the second channel moves from the second position to the third position.

8. The seal assembly of claim 2 wherein the first channel comprises a pair of jamb sections extending from the header section and the second channel comprises a pair of jamb sections corresponding to the pair of jamb sections of the first channel.

9. The seal assembly of claim 8 wherein the lower wiper seal extends between outer ones of the flanges of the pair of jamb sections of the second channel.

10. The seal assembly of claim 8 wherein the upper wiper seal extends between outer ones of the flanges of the pair of jamb sections of the first channel.

11. The seal assembly of claim 1 wherein the structure is a recreational vehicle, the first channel is attached to a side-wall of the recreational vehicle, and the second channel is attached to the slide-out compartment.

12. The seal assembly of claim 11 wherein the slide-out compartment is a slide-out room.

13. The seal assembly of claim 1 wherein the wiper seals have an attachment portion and a wiper portion.

14. The seal assembly of claim 13 wherein the wiper portion of the wiper seals is made of rubber.

15. In a recreational vehicle having side-wall, an opening in the side wall, and a slide-out room configured to selectively extend in a first direction generally perpendicular to the side wall between a first position and a second position and to selectively move in a second direction generally perpendicular to the first direction between the second position and a third position, a seal assembly comprising:

a wall channel configured for attachment to the side wall, the wall channel comprising a web and a pair of flanges extending from the web, the web and flanges of the wall channel cooperating to define an interior of the wall channel, the wall channel further comprising a header section and a pair of jamb sections extending from the header section;

a slide-out room channel configured for attachment to the slide-out room, the slide-out room channel comprising a web and a pair of flanges extending from the web, the web and flanges of the slide-out room channel cooperating to define an interior of the slide-out room channel, the slide-out room channel further comprising a header section and a pair of jamb sections corresponding to the header section and jamb sections of the wall channel;

a first pair of wiper seals attached to the wall channel and operably associated with the interior of the header section of the wall channel, each of the first pair of wiper seals having a wiper portion directed generally toward and overlapping the wiper portion of the other of the first pair of wiper seals; and a second pair of wiper seals attached to the wall channel and operably associated with the interior of the jamb sections of the wall channel, a first of the second pair of wiper seals having a wiper portion directed generally toward the wiper portion of the other of the second pair of wiper seals;

wherein a flange of the pair of flanges of the slide-out room channel is received in the interior of the wall channel such that each of the wiper seals engages the flange of the pair of flanges of the slide-out room channel when the slide-out room is moved from the first position to the second position and when the slide-out room is moved between the second position and the third position.

16. The seal assembly of claim 15 wherein the first pair of wiper seals comprises an upper wiper seal and a lower wiper seal, and a portion of the upper wiper seal overlaps a portion of the lower wiper seal.

17. The seal assembly of claim 16 wherein a free end of the flange of the pair of flanges of the slide-out room channel first contacts the upper wiper seal when the slide-out room channel is moved in the first direction toward the first channel.

18. The seal assembly of claim 17 wherein the upper wiper seal partially extends when the second channel moves from the second position to the third position.

19. The seal assembly of claim 17 wherein the lower wiper seal is deflected when the second channel moves from the second position to the third position.

\* \* \* \* \*